United States Patent
Lundby

(10) Patent No.: US 7,733,792 B2
(45) Date of Patent: *Jun. 8, 2010

(54) METHOD AND APPARATUS FOR ADJUSTING A SIGNAL-TO-INTERFERENCE THRESHOLD IN A CLOSED LOOP POWER CONTROL COMMUNICATIONS SYSTEM

(75) Inventor: Stein A. Lundby, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/316,480

(22) Filed: Dec. 10, 2002

(65) Prior Publication Data
US 2003/0083082 A1 May 1, 2003

Related U.S. Application Data

(63) Continuation of application No. 09/340,499, filed on Jun. 30, 1999, now Pat. No. 6,529,482.

(51) Int. Cl.
*H04J 1/16* (2006.01)
*H04J 3/14* (2006.01)
*H04L 1/00* (2006.01)
*H04L 12/26* (2006.01)
*G08C 17/00* (2006.01)

(52) U.S. Cl. ............... 370/252; 370/311; 370/278; 455/522; 455/69; 455/13.4

(58) Field of Classification Search ........... 370/252, 370/342, 335, 441, 311, 278; 375/130, 140, 375/148, 317, 219, 224; 45/552; 455/522, 455/69, 13.4
See application file for complete search history.

(56) References Cited

U.S. PATENT DOCUMENTS 4,901,307 A  2/1990  Gilhousen et al.

(Continued)

FOREIGN PATENT DOCUMENTS

WO  9823044  5/1998

(Continued)

OTHER PUBLICATIONS

A. Sampath, et al., "*On Setting Reverse Link Target SIR in a CDMA System*," IEEE Conference, Phoenix, May 4-7, 1997, New York, vol. Conf. 47, May 4, 1997.

(Continued)

*Primary Examiner*—Ricky Ngo
*Assistant Examiner*—Luat Phung
(74) *Attorney, Agent, or Firm*—D. Scott Juneau

(57) ABSTRACT

A method and apparatus for dynamically adjusting the signal-to-interference ratio (SIR) threshold used to control signal transmission power in closed loop communication systems. The closed loop power control comprises an inner loop that provides up/down transmission power control commands to a transmitter based upon a comparison of the SIR for a received signal to the threshold SIR. The outer loop dynamically adjusts the threshold SIR using historic inner loop power control information. When it is detected that the inner loop is not acceptably performing power control, the target SIR is not changed, or may increased or decreased more or less than 0.5 dB or 0.5 dB/99, respectively.

41 Claims, 5 Drawing Sheets

U.S. PATENT DOCUMENTS

| | | | |
|---|---|---|---|
| 5,056,109 A | | 10/1991 | Gilhousen et al. |
| 5,103,459 A | | 4/1992 | Gilhousen et al. |
| 5,216,692 A | * | 6/1993 | Ling |
| 5,305,468 A | * | 4/1994 | Bruckert et al. ............... 455/69 |
| 5,623,484 A | * | 4/1997 | Muszynski ................. 370/335 |
| 5,710,981 A | * | 1/1998 | Kim et al. |
| 5,727,033 A | | 3/1998 | Weaver et al. |
| 5,903,554 A | | 5/1999 | Saints |
| 5,946,346 A | * | 8/1999 | Ahmed et al. |
| 5,982,760 A | | 11/1999 | Chen |
| 6,070,086 A | * | 5/2000 | Dobrica ...................... 455/522 |
| 6,075,974 A | | 6/2000 | Saints et al. |
| 6,084,904 A | | 7/2000 | Wang et al. |
| 6,151,508 A | | 11/2000 | Kim et al. |
| 6,167,273 A | | 12/2000 | Mandyam |
| 6,181,738 B1 | | 1/2001 | Chheda et al. |
| 6,208,873 B1 | | 3/2001 | Black et al. |
| 6,226,526 B1 | * | 5/2001 | Sakoda et al. ............... 455/522 |
| 6,295,289 B1 | * | 9/2001 | Ionescu et al. |
| 6,373,823 B1 | | 4/2002 | Chen et al. |
| 6,396,804 B2 | | 5/2002 | Odenwalder |
| 6,493,564 B2 | * | 12/2002 | Longoni et al. ............. 455/522 |
| 6,639,934 B1 | * | 10/2003 | Engstrom et al. ........... 375/130 |
| 7,158,490 B1 | * | 1/2007 | Tran et al. ................... 370/318 |

FOREIGN PATENT DOCUMENTS

| | | |
|---|---|---|
| WO | 9858461 | 12/1998 |
| WO | 9918702 | 4/1999 |
| WO | 0045528 | 8/2000 |

OTHER PUBLICATIONS

International Search Report, PCT/US00/017705, International Search Authority,European Patent Office, Nov. 22, 2000.

European Search Report—EP08007005—Search Authority—The Hague—Jul. 10, 2008.

* cited by examiner

METHOD AND APPARATUS FOR ADJUSTING A SIGNAL-TO-INTERFERENCE THRESHOLD IN A CLOSED LOOP POWER CONTROL COMMUNICATIONS SYSTEM

CLAIM OF PRIORITY UNDER 35 U.S.C. §120

The present Application for Patent is a Continuation and claims priority to patent application Ser. No. 09/340,499 entitled "METHOD AND APPARATUS FOR ADJUSTING A SIGNAL-TO-INTERFERENCE THRESHOLD IN A CLOSED LOOP POWER CONTROL COMMUNICATIONS SYSTEM" filed Jun. 30, 1999 now U.S. Pat. No. 6,529,482, now allowed, and assigned to the assignee hereof and hereby expressly incorporated by reference herein.

BACKGROUND

I. Field of the Invention

The present invention relates to a wireless communications system. In particular, the present invention describes a closed loop power control system.

II. Description of the Related Art

The invention described in this application is discussed in the context of a code division multiple access (CDMA) communications system. However, one skilled in the art will recognize that the invention is adaptable for use in all types of wireless communication systems, especially high-rate systems where data transmission may result in a lack of sufficient transmission power to ensure reliable transmission of all information.

1. CDMA Modulation Techniques

The use of code division multiple access (CDMA) modulation techniques is one of several techniques for facilitating communications in large-scale wireless communication systems. Other multiple access communication system techniques, such as time division multiple access (TDMA) and frequency division multiple access (FDMA) are well known in the art. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and in U.S. Pat. No. 5,103,459, entitled "SYSTEM AND METHOD FOR GENERATING SIGNAL WAVEFORMS IN A CDMA CELLULAR TELEPHONE SYSTEM," both of which are assigned to the assignee of the present invention and incorporated by reference herein.

As wireless communication has become more common, there has been an increasing demand for wireless communications systems that can transmit digital information at high-rates. One method for sending high-rate data from a remote station to a base station is to allow the remote station to send the data using the spread spectrum techniques of CDMA. This method allows the remote station to transmit its information using a small set of orthogonal channels, and is described in detail in U.S. patent application Ser. No. 08/886,604, entitled "HIGH DATA RATE CDMA WIRELESS COMMUNICATION SYSTEM," now U.S. Pat. No. 6,396,804 issued May 28, 2002, assigned to the assignee of the present invention and incorporated by reference herein.

However, as more customers use wireless communication systems, control of the power or energy used to transmit a communication signal becomes even more important. If a communication signal is transmitted at too high a power level, the transmission may interfere with other transmissions. If it is sent at too low a power level, the information contained in the signal might not be received with sufficient reliability. Further, transmitting a signal at the lowest possible power is desirable because, among other things, transmitter battery power in a mobile station can be saved.

2. Power Control

Generally, current "fast" power control techniques used in closed loop wireless communication systems consist of an inner loop and an outer loop. A known and useful method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM," assigned to the assignee of the present invention and incorporated by reference herein. Another technique, used to control the maximum transmission power by gating, capping, or ignoring a power control command, is disclosed in U.S. patent application Ser. No. 09/239,454, entitled "METHOD AND APPARATUS FOR CONTROLLING TRANSMISSION POWER IN A POTENTIALLY TRANSMISSION GATED OR CAPPED COMMUNICATION SYSTEM," filed Jan. 28, 1999, now U.S. Pat. No. 6,373,823, issued Apr. 16, 2002, assigned to the assignee of the present invention, and incorporated by reference herein.

As shown in FIG. 1($a$), the inner loop controls transmission power by tracking a desired or target signal-to-interference ratio (SIR). A target SIR is selected, and then the estimated SIR for each transmission received by a respective station is compared to the target SIR. If the received transmission is below or above the target SIR, then a responsive up or down (up/down) power control command is sent back to the transmitter to adjust the transmission power as shown in FIG. 1($b$). Because these power increases are usually done in increments of ±0.5 dB, the power increases and decreases only approximate the ideal transmit power, as shown in FIG. 1($c$).

The outer loop sets the target SIR that is used by the inner loop. Typically, an outer loop employs an algorithm that increases substantially the target SIR if the quality of a decoded received signal degrades below an acceptable level, usually triggered by a frame error detection or an unacceptably high frame error rate (FER). However, as discussed below, when a selective deep fade of a transmitted signal occurs, or when a transmitter cannot increase its transmission power, increasing the target SIR by any amount will not be an appropriate response.

A selective deep fade is a deep fade condition that is short in duration. As shown in FIG. 2($a$)—where line 202 represents the strength of an ideal received signal and t represents time—when the strength of the received signal 204 abruptly decreases, thereby causing the quality of the received signal to fall outside an acceptable range 206, a selective deep fade condition has occurred. In current power control systems, when this selective deep fade condition occurs—causing the quality the received signal 204 to degrade—the target SIR will be increased. But due to the temporary nature of the selective deep fade condition, increasing the target SIR may not be an appropriate power control command response, because the cause of the reduced signal reliability is not due to an inappropriately set target SIR.

Another limitation of current power control techniques is the inability to track sudden severe changes in the propagation path of the transmitted signal whereby large increases in signal transmission power are needed for the signal to be received reliably. This problem, referred to herein as a slope overload problem, is illustrated in FIG. 2($b$). As shown, when power variation requirements in the signal to be tracked are large compared to the update frequency and "step" size of the actual power changes, quantization of the signal cannot follow. Although the target SIR may be increased or decreased in steps as required, this may not be a correct response, and even if it is, the subsequent change in transmission power will not always be adequate. Current systems generally limit power adjustments to approximately ±0.5 dB (regardless of the amount of degeneration in the propagation path.) The slope overload condition illustrated in FIG. 2(b), shows that when the ideal power requirement P rises quickly, the stepped power increases Pt of current systems cannot keep up.

Yet another limitation of currently known systems is that the inner loop continues to make power increase requests even when the communication system cannot fulfill the request. This power-ceiling problem occurs when the transmitter is incapable of increasing transmission power. For example, the transmitter batteries may be low, or the transmitter's amplifier may be saturated if more power is used. In these cases, repeated "up" power requests may be made by the inner loop power control that cannot be fulfilled. During this period when the transmission energy is capped, the target SIR may be needlessly increased by the outer loop because the signal is received with inadequate reliability.

What is needed is a power control technique that uses a "smarter" outer loop power control. The outer loop power control should be able to detect events that prohibit the transmission power of a signal from being increased or decreased. The outer loop should also be able to detect selective deep fading, a slope overload condition, or system symptoms that indicate that the closed loop power control is not correctly responding to a signal quality problem. Ideally, the outer loop would also be able increase or decrease of power proportional to the detected problem be initiated.

SUMMARY OF THE INVENTION

Broadly, the present invention concerns a closed loop power control method and apparatus for use in a wireless communication system. More specifically, the present invention provides a closed loop power control method and apparatus that can detect a selective deep fade condition, or other condition, that prevents the closed loop power control system from adequately responding to a loss of received signal quality.

The invention may be implemented in one embodiment as an apparatus for dynamically adjusting a target signal-to-interference ratio (SIR) based upon transmission power control performance information. This target SIR is implemented in the closed loop power control system of a wireless communications network. The closed loop power control system may have an inner loop and an outer loop, and include a detection means for identifying typical inner loop power control command patterns which indicate that a poor closed loop power control response will occur. These command patterns may indicate that the inner loop is not correctly coordinating increases and decreases in transmission power. The apparatus includes an outer loop power control means for adjusting the target SIR in accordance with information received concerning the closed loop's past power control performance.

In another version, the invention may be embodied as a method for adjusting the target SIR of a closed loop power control system used in a wireless communications network. An inner loop and an outer loop characterize the closed loop power control system. In one method embodiment, the method comprises the steps of generating inner loop power control commands in accordance with a comparison between the estimated SIR and the target SIR, and adjusting the target SIR in accordance with the estimated SIR. This method is followed unless a second quality metric indicates that the inner loop power commands are not sufficient for the situation at hand. If the inner loop power commands are not sufficient, then the method either suspends that of the target SIR, or adjusts the target SIR by an amount less than the amount the adjustment would have been made if the adjustment had been made based only on the first quality metric. In another embodiment, the second quality metric is only used if a verification check for the last frame of information received fails, such as a failed cyclic redundancy check (CRC) bit check.

The invention affords its users a number of distinct advantages. These advantages are realized because the outer loop of the closed loop power control is a "smart" outer loop. The outer loop can detect to events that prohibit the increase or decrease of the transmission power of a signal, and adjust the target SIR accordingly. Another advantage is that the outer loop can respond to a selective deep fade condition, a slope overload condition, or system symptoms that indicate that the inner loop power control command responses are temporarily failing to track sudden changes in the propagation path. And in yet another embodiment, the outer loop of the present invention signals that an increase or decrease of power directly proportional to a detected problem should be initiated.

As readily recognizable to one skilled in the art, the invention also provides a number of other advantages and benefits that will become apparent after reviewing the following description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout, and wherein.

DETAILED DESCRIPTION

The nature, objects, and advantages of the invention will become more apparent to those skilled in the art after considering the following detailed description in connection with the accompanying drawings. As mentioned above, the invention concerns a method and system for providing improved closed loop power control in a telecommunications network.

Method of Operation

Figure 1A:
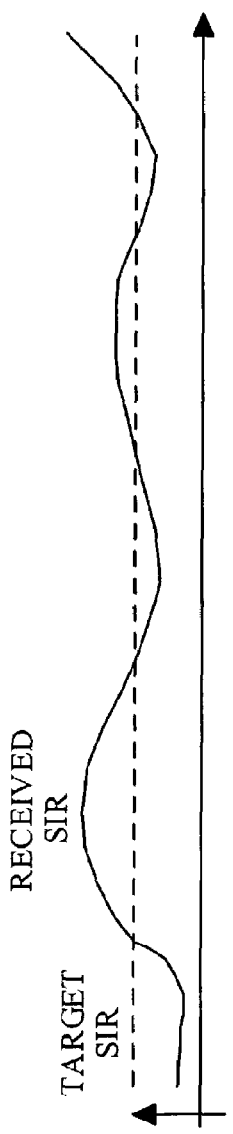
FIG. 1(a) compares the received SIR for a signal over time with the target SIR.
Figure 1B:
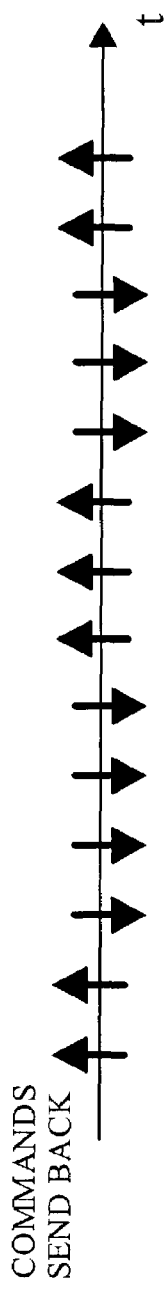
FIG. 1(b) illustrates a typical series of up/down commands made by an inner loop power control.
Figure 1C:
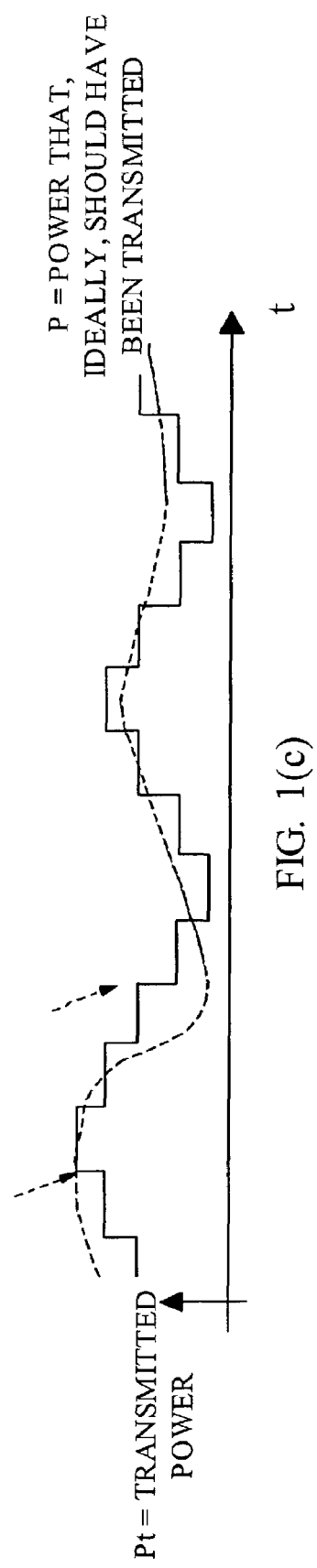
FIG. 1(c) compares the actual transmitted power Pt with the ideal transmission power P as a function of time.
Figure 2A:
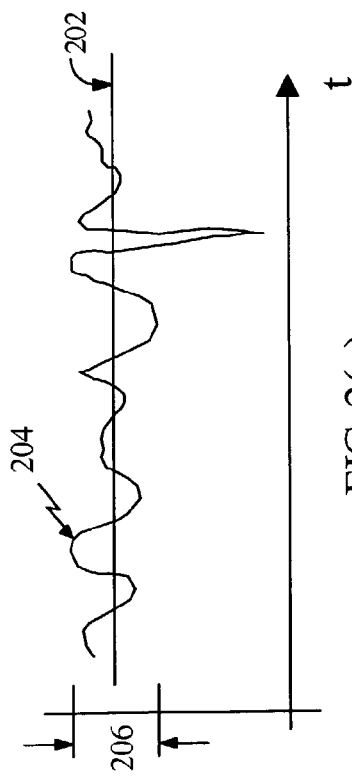
FIG. 2(a) illustrates a selective deep fade problem that may occur in wireless communication systems.
Figure 2B:
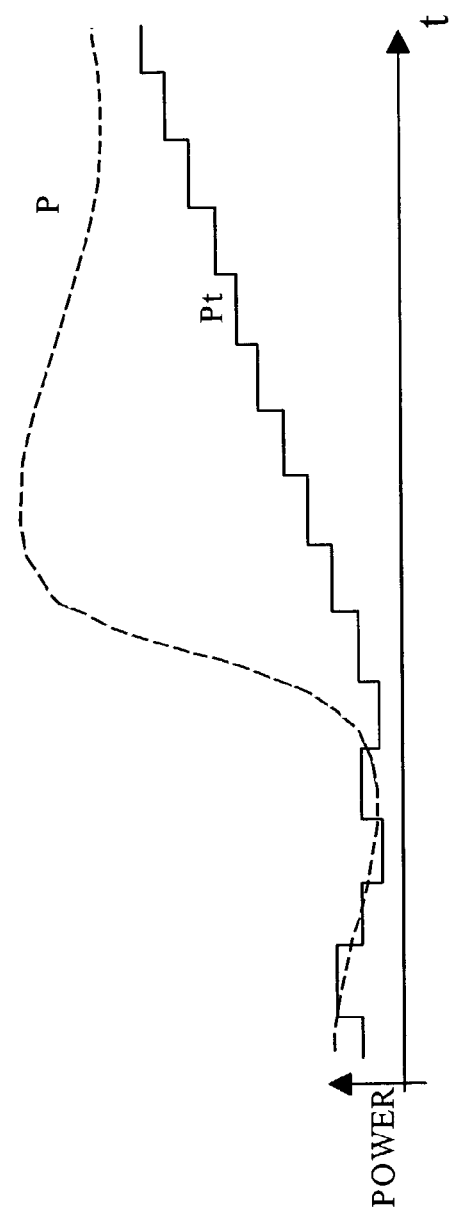
FIG. 2(b) illustrates a slope overload problem that may occur in wireless communication systems.
Figure 3:
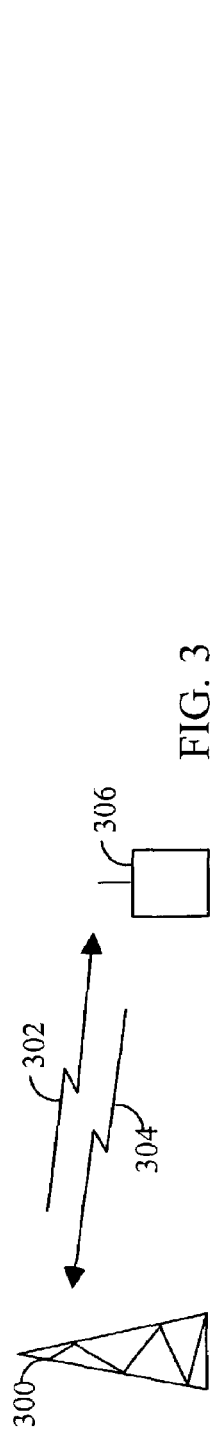
FIG. 3 is a block diagram illustrating the basic components of a wireless communication system in accordance with the present invention.

FIG. 3 shows a wireless communication system in which a base station 300 transmits a wireless communication signal 302 to a mobile station 306. Transmissions from base station 300 to mobile station 306 are referred to as forward link transmissions, and transmissions from mobile station 306 to base station 300 are known as reverse link signals 304. In an exemplary embodiment, the wireless communication signals are transmitted using a code division multiple access (CDMA) modulation, described in detail in the U.S. Pat. Nos. 4,901,307 and 5,103,459, and standardized in Telecommunications Industry Association Interim Standard TIA/EIA/IS-95-A, entitled "MOBILE STATION-BASE STATION COMPATIBILITY STANDARD FOR DUAL-MODE WIDEBAND SPREAD SPECTRUM CELLULAR SYSTEM." However, the present invention is equally applicable to any wireless communication system employing a closed loop power control system.

The Telecommunications Industry Association (TIA), in a submission to the International Telecommunication Union (ITU) entitled "THE cdma2000 ITU-R RTT CANDIDATE SUBMISSION," has proposed an evolution of the above IS-95 standard to provide for high-rate data transmission. Similarly, the European Telecommunications Standards Industry (ETSI) has proposed an alternative evolution in a proposal to the ITU entitled "THE ETSI UMTS TERRESTRIAL ACCESS (UTRA) ITU-R RTT CANDIDATE SUBMISSION." The present invention is well suited for use in systems based on either the cdma2000 or UTRA candidate submissions, as where high-rate data transmission frequently results in a lack of sufficient transmission power to ensure reliable transmission of the data. Thus, in exemplary embodiments, forward link signals 302 may be CDMA high-rate data signals known in the art and described in the cdma2000 or UTRA proposals.

In one embodiment, forward link signals 302 may include a variety of distinct signals. For example, the signals may include pilot signals that allow for coherent demodulation by mobile station 306, primary traffic data signals such as voice data, supplemental high-rate data signals such as facsimile transmissions, and power control signals. It will be understood by one skilled in the art that these types of information—information that can be transmitted within the forward link signals 302—is neither inclusive nor exclusive. The information and signals may vary in different embodiments of the present invention. For example, the forward link might not include primary traffic data. Moreover, it should be apparent that the present invention is equally applicable to power control of the reverse link signals.

In mobile station 306, forward link signals 302 are received from base station 300 and demodulated. Mobile station 306 determines the adequacy of the received signal power of forward link signals 302 as described in greater detail below. Received signal power is adequate if the power for each frame received is sufficient to allow reliable demodulation and decoding of the information contained in the signal. In accordance with the determined adequacy of the received signal energy of forward link signals 302, the mobile station 306 generates a series of power control commands. In one embodiment, the power control commands consist of a series of one bit (up/down) power control commands to which base station 300 responds by increasing or decreasing the transmission energy of forward link signals 302.

Mobile station 306 estimates the signal to interference ratio—or a representative metric related to it—for forward link signal 302 and compares the estimated signal to interference ratio to a target SIR. If the estimated SIR is lower than the target SIR, an "up" power control command signal is sent directing base station 300 to increase the transmission power of forward link signals 302. If the estimated SIR is higher than the target SIR, then a "down" power control command is sent directing base station 300 to decrease the transmission power of forward link signal 302.

The target SIR is set to provide a desired signal quality, such as a desired frame error rate, a desired symbol error rate, or bit error rate. This desired signal quality may vary based upon the type of service being provided on forward link signal 302. It may seem strange to speak of a received signal being too "high-quality," but it should be remembered that this excess quality equates to unnecessary energy being employed in the transmission of the forward link signals 302 to mobile station 306. Employing unnecessary energy results in a degradation of service to all other mobile stations serviced by base station 300, and in a reduction in the number of mobile stations 306 that may be served by base station 300. Therefore, when the actual quality level of the received forward link signals 302 varies from the desired quality level, the target SIR is changed such that forward link signals 302 are received at the desired level of quality. Adjustment of the target SIR is hereafter referred to as outer loop power control.

Inner Loop Power Control

In one embodiment of the present invention, the mobile station 306 generates the power control commands and transmits them along with traffic data and pilot symbol data back to base station 300 on reverse link signals 304. In exemplary embodiments, the reverse link signals 304 are CDMA signals transmitted in accordance with either the ETSI UTRA, the TIA cdma2000, ARIB's W-CDMA, or T1P1's WIMS candidate submissions. As emphasized above, the present invention is equally applicable to other forms of CDMA signals, and to other modulation schemes such as TDMA or GSM used in closed loop power control systems.

Usually, base station 300 receives the power control commands from mobile station 306, and in response to those commands increases or decreases the transmission energy of forward link signals 302. However, there may be times when the inner loop power control commands cannot be followed for a variety of reasons. For example, base station 300 may not increase the energy of forward link signals 302 in response to power control commands if base station 300 determines that an additional energy allocation for transmission of forward link signals 302 would cause unacceptable degradation of the transmission of signals for other mobile stations serviced by base station 300. If the power of the reverse link is being controlled, a low battery in mobile station 306 may prevent any transmission power increase.

To determine whether base station 300 was able to respond to the transmitted power control commands, the number of consecutive "up" commands sent to the transmitter in the closed loop system is monitored in one embodiment of the present invention. An excessive number of consecutive "up" commands is indicative of a slope overload condition or the inability of the transmitter to increase power, as discussed above. When such a pattern is detected, adjustment to the target SIR may be inhibited. In another embodiment, the number of "up" commands ($N_{up}$), consecutive or otherwise, that occurred in a predetermined number of earlier inner loop power control commands may be used in controlling the outer loop response. In another embodiment, an estimated SIR of forward link signal 302 is compared to the target SIR. If the difference between the two exceeds a threshold, adjustment of the target SIR is inhibited.

In both of the methods described above, information gained from the inner loop power control is used in determining the target SIR. The inner loop information is continuously communicated to the outer loop. And although each of the inner loop methods has been described in various embodiments using up/down commands, these methods may be adapted for use in any system using fast feedback to a transmitter to adjust transmit power on one or several antennas, carriers or directive antenna arrays.

Outer Loop Power Control

Figure 4:
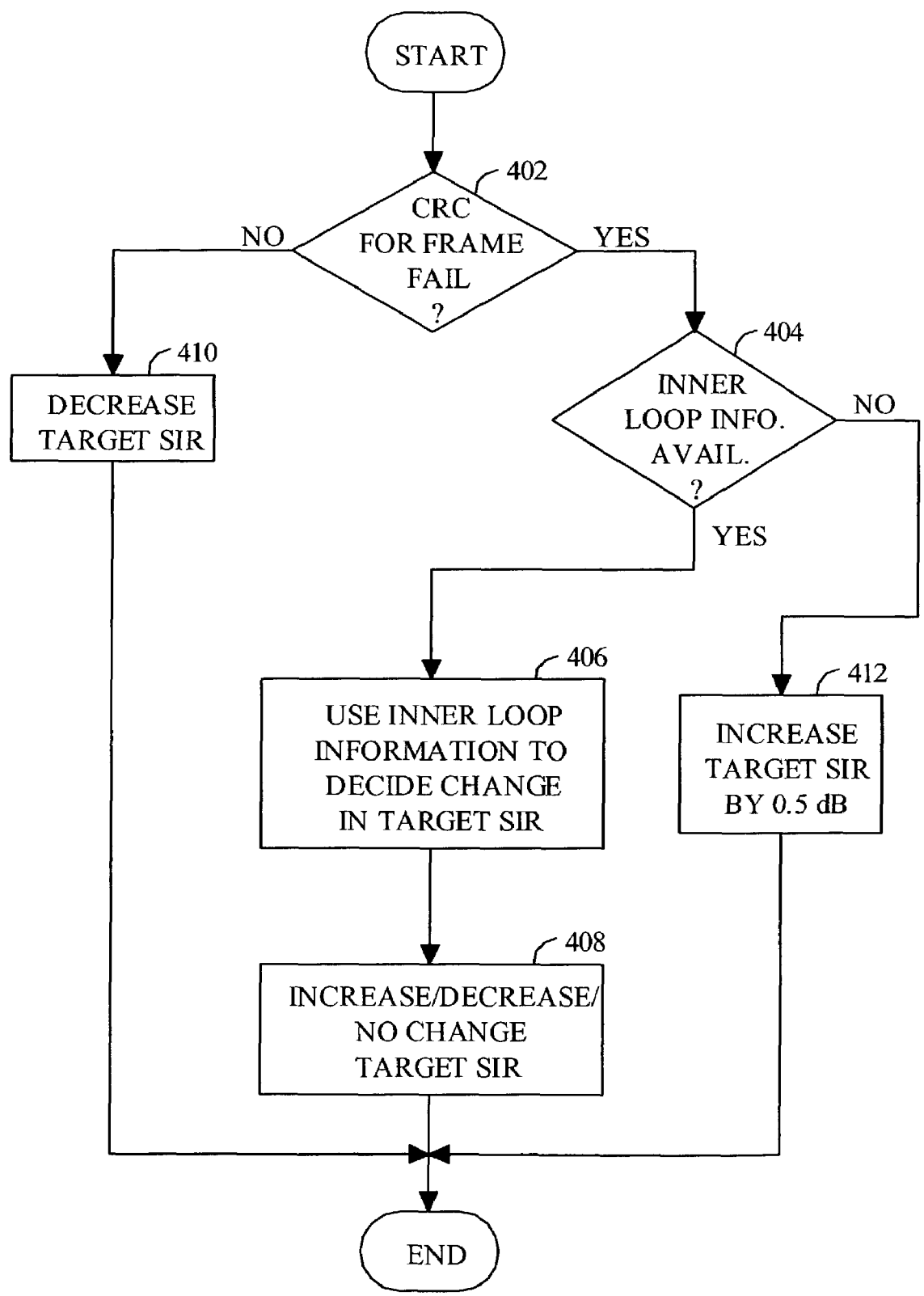
FIG. 4 is a flow diagram of an outer loop power control method in accordance with one embodiment of the presence invention.

Using the inner loop power control information discussed above, the performance of the outer loop power control can be improved. In IS-95 systems, the target SIR is increased by 0.5 dB upon detection of a frame error and is decreased by 0.5 dB/99 when a frame is reliably received. Under static channel conditions, these adjustments to the target SIR result in a frame error rate of 1%. In IS-95 systems, frame errors are detected by means of a CRC check the implementation of which is well known in the art. In block 410 of FIG. 4, the target SIR is decreased by a predetermined amount upon detection of a reliably received frame in block 402. In block 412, the target SIR is increased upon detection of a frame error. This is based on the assumption that if the inner loop power control was tracking the target SIR, and the most recently received frame of information did not meet the preselected quality level, then the target SIR must have been set too low. But this assumption is not always true. For example, the inner loop power control may be unable to maintain the received SIR near the target SIR due to a power outage, interrupted feedback of power control information, slope overload, selective deep fading, or other similar reason. In these cases, increasing the target SIR is an incorrect response, resulting in an excess of power in subsequent frames, and thereby wasting power and causing the problems discussed above.

Accordingly, when a CRC check for a frame fails in task 402, the present invention uses the inner loop power control information as described in the Inner Loop Power Control section above and shown in task 404 to decide whether or not to change target SIR in task 406. If, based upon this information, the inner loop power control was not then tracking the changes in the propagation path then changes to the target SIR are inhibited in block 408. For example, if the number of consecutive "up" commands sent to the transmitting station shows a pattern indicative of a slope overload, then adjustments to the target SIR may be inhibited.

Figure 5:
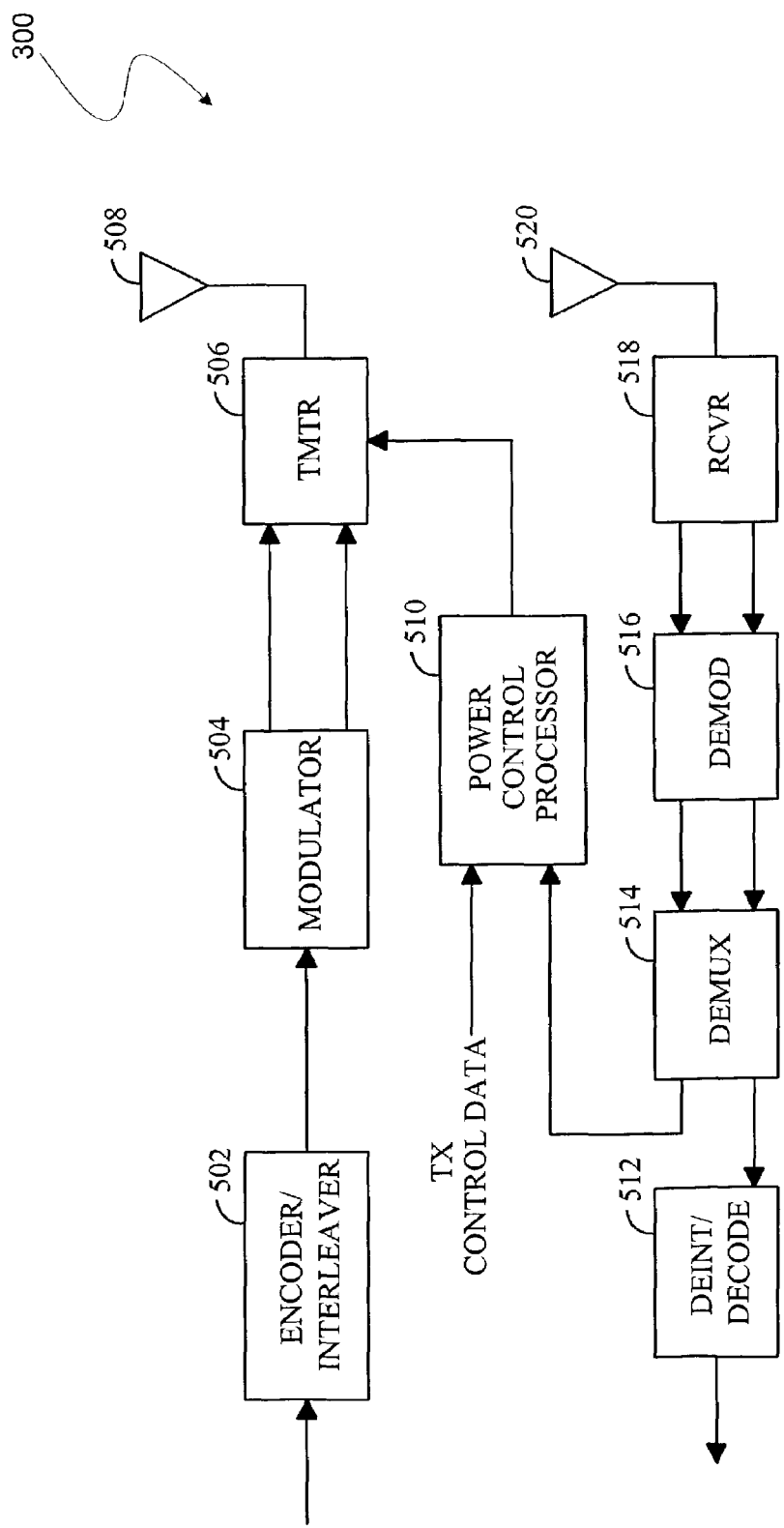
FIG. 5 is a block diagram of one embodiment of base station 300 shown in FIG. 1.
Figure 6:
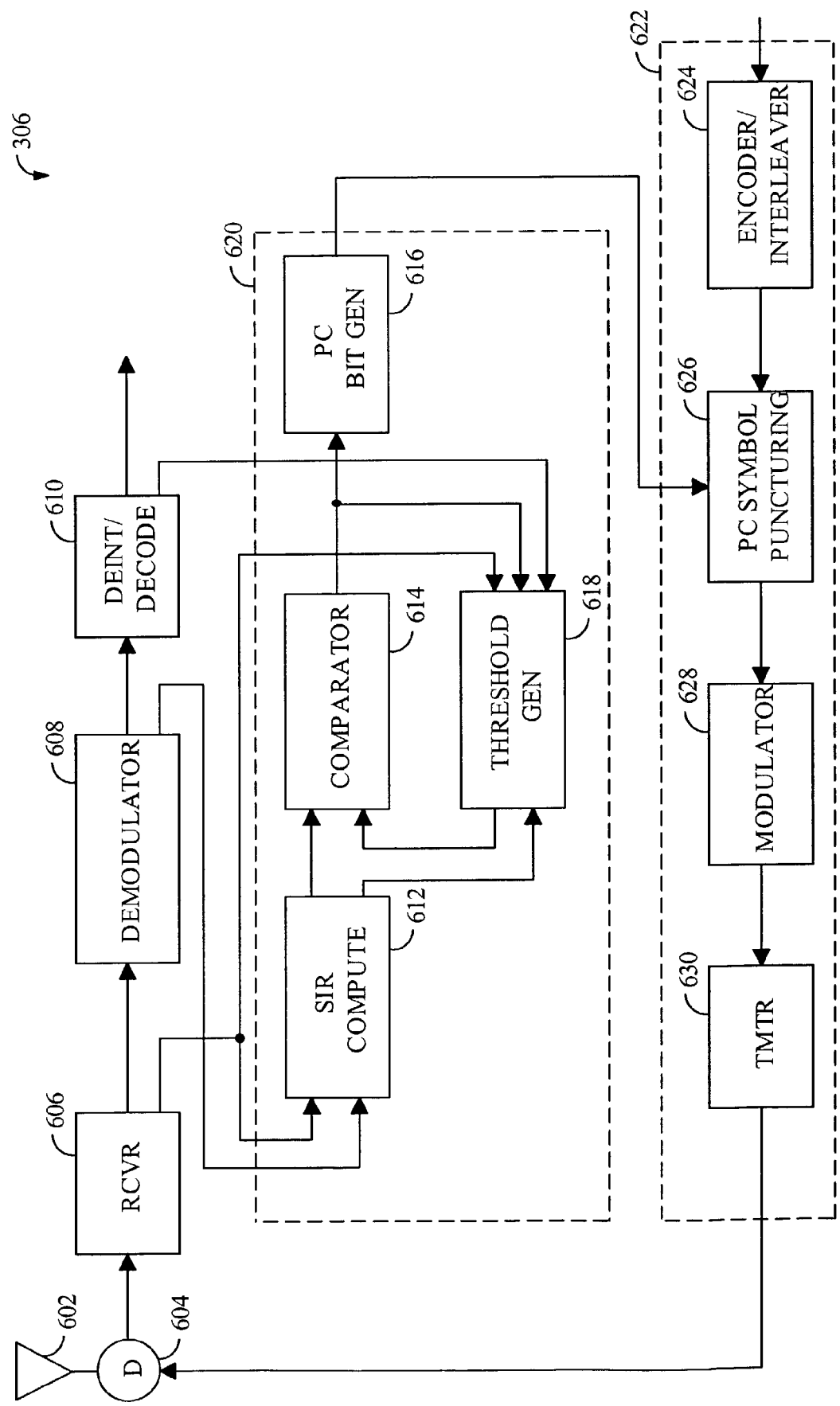
FIG. 6 is a block diagram of one embodiment of mobile station 306 shown in FIG. 1 of the present invention.

In addition to the various method embodiments described above, a different aspect of the invention concerns various hardware components and interconnections as described in FIGS. 3, 5, and 6.

Hardware Components and Interconnections

FIG. 5 illustrates a simplified block diagram of base station 300 shown in FIG. 3 and discussed above. Information for transmission on forward link signals 302 is provided to encoder/interleaver 502, which provides forward error correction on the data and then reorders the symbols in accordance with a predetermined interleaver format to provide time diversity in the transmitted signal. The interleaved encoded symbols are provided to modulator 504. In one embodiment, modulator 504 is a CDMA modulator, the design and implementation of which is known in the art and described in detail in U.S. Pat. Nos. 4,901,307 and 5,103,459 cited above. In an exemplary embodiment, modulator 504 is a CDMA modulator capable of transmitting high-rate data such as is described in the aforementioned UTRA and cdma2000 specifications.

The modulated signal is provided to a transmitter (TMTR) 506 that converts, amplifies and filters the signal for transmission. In one embodiment, transmitter 506 modulates the signals for transmission using a quaternary phase shift keying (QPSK) modulation format. However, the present invention is applicable to any form of modulation, such as BPSK, QAM or FSK modulation. The modulated signals are amplified to a level of transmission energy in accordance with a power control signal from a power control processor 510. The QPSK signal is provided from transmitter 506 for transmission through antenna 508 as forward signals 302.

Turning to FIG. 6, forward link signals 302 are received by mobile station 306, also shown in FIG. 3, at an antenna 602 and are provided through a duplexer (D) 604 to receiver (RCVR) 606. Receiver 606 down converts, filters and amplifies received forward link signals 302 and provides signals to a DEMODULATOR 608. In addition, receiver 606 communicates an indication of the in-band signal energy SIR COMPUTE 612, and to THRESHOLD GENERATOR 618, the operation of both being described below.

DEMODULATOR 608 demodulates the received signals and provides demodulated symbol data to a de-interleaver/decoder (DEINT/DECODE) 610. In addition, demodulator 608 provides an indication of the demodulated signal energy to SIR compute 612 and threshold generator 618. DEINT/DECODE 610 reorders the demodulated symbols and decodes the reordered symbols in accordance with a predetermined error correction format, such as a convolutional decoding or turbo-decoding format, and provides the decoded data stream to the user of the mobile station 306. The decoded data stream may be further processed prior to being provided to the user of mobile station 306. In addition, DEINT/DECODE 610 provides a signal indicative of whether the frame was reliably decoded or, alternatively, an indication of the symbol error rate in the decoded frame of data to THRESHOLD GEN 618.

In another embodiment, information from RCVR 606 and from DEMODULATOR 608 is provided to a forward link power control processor 620. The processor 620 performs at least the functions of estimating the SIR, determining whether or not the target SIR (threshold) should be changed, comparing the SIR with the target SIR, and generating an indicator of whether or not power should be increased or decreased.

A simplistic method of computing signal to interference ratio would be to assume that all in-band energy is representative of the interference energy. Because receiver 606 typically includes an automatic gain control element (not shown) that normalizes the signal based on the amount of in-band energy, this value can be provided directly from receiver 606 to SIR COMPUTE 612. DEMODULATOR 608 demodulates received signal and extracts the forward link signals 302 from signals that are intended for transmission to other mobile stations served by base station 300. The energy of the demodulated symbols is summed to provide a signal energy estimate. The signal energy estimate provided is then divided by the in-band energy value to provide a rough estimate of the SIR.

In the exemplary embodiment, the forward link signals 302 are variable rate transmission signals wherein the rate is unknown a priori to mobile station 306. In exemplary variable rate forward link signals 302, each transmitted signal is repeated within the transmission signal as many times as possible to fill a fixed length frame of data. More importantly for purposes of the present invention, the energy of the signal is varied in inverse proportion to the amount of repetition in forward link signals 302. This results in a constant symbol energy and approximately uniform performance across the rates.

This complicates the estimation of the signal energy because the symbol energy is spread across time and, in order to determine the sufficiency of the symbol energy, the signal energy estimation algorithm must have a fixed reference that does not vary with the unknown rate of the information. In one exemplary embodiment, power control bits or pilot symbols are inserted or punctured into forward link signals 302, and the energy of these bits is set at a fixed relation to the energy used in the transmission of the maximum rate information signal. In one embodiment, the power control signal and the forward link signals 302 are multiplexed in a channel, such as the multiplexing scheme inherent in wideband cdma (wcdma) applications.

These non-rate varying power control symbols can be used in one of two ways. They can either be used to make a preliminary estimation of the rate of the information signal by estimating the ratio between the fixed energy power control symbols. The energy of the traffic data is a preliminary estimate of the rate at which the traffic data can be made, and this can be used to modify the computed traffic energy for comparison with a single non-varying signal to interference ratio threshold. Alternatively, the preliminary rate estimation can be used such that the signal to interference ratio is compared to a set of rate dependent thresholds.

An alternative method for using power control bits that have a fixed transmission energy relationship to the transmission energy of the maximum rate information signal is to use the power control bits themselves to compute the signal energy. Under this method the energies of the power control bits represent the signal energy and this energy is computed and used directly in the computation of the signal to interference.

Another difficulty in computing the signal to interference ratio of the received CDMA signal is a result of the orthogonality of single path signals from base station 300 to mobile station 306 shown in FIG. 3. The problem is that the in-band energy does not accurately represent the interference energy in a strong single path reception scenario such as when mobile station 306 is in the line of sight of base station 300. The in-band energy will include energy that is orthogonal to forward link signals 302 and the orthogonal energy does not contribute to the interference limiting noise because it can be entirely eliminated in the demodulation process.

In the exemplary embodiment, base station 300 modulates the signal by first spreading the data in accordance with an orthogonal channelization and then spreading the resultant orthogonally spread data in accordance with a pseudo noise (PN) sequence. PN sequences include Gold codes and maximal length codes the generation of which is well known in the art. One method of dealing with the additional complexity of orthogonal in band energy is to remove the PN spreading and to compute the energy of the despread signal. This energy can then be subtracted from the in band energy to provide an estimate of the estimate of the noise signal. Another method for estimating interference is computing the variance on a fixed energy signal that is part of forward link signal 302, such as a fixed energy pilot signal.

The complexities of computing the signal to interference ratio in an variable rate CDMA signal using orthogonal spreading is addressed in U.S. patent application Ser. No. 08/722,763, filed Sep. 27, 1996, entitled "METHOD AND APPARATUS FOR MEASURING LINK QUALITY IN A SPREAD SPECTRUM COMMUNICATION SYSTEM", now U.S. Pat. No. 5,903,554, and co-pending U.S. patent application Ser. No. 09/239,451, filed Jan. 28, 1999, entitled "METHOD AND APPARATUS FOR CONTROLLING TRANSMISSION POWER IN A CDMA COMMUNICATION SYSTEM" disclosures of which are assigned to the assignee of the present invention and incorporated by reference herein. It will be understood by one skilled in the art that the present invention is equally applicable to any method for computing the signal quality metric that is used to compare against the threshold value.

Returning to FIG. 6, SIR COMPUTE 612 provides the signal to interference ratio estimate to COMPARATOR 614 and THRESHOLD GEN 618. In COMPARATOR 614, the signal to interference ratio estimate is compared against target SIR. In the exemplary embodiment, a single threshold is used and a single bit is provided from COMPARATOR 614 indicative of whether the signal to interference estimate is greater than or less than target SIR. This single power control bit is provided to power control bit generator (PC BIT GEN) 616. PC BIT GEN 616 generates a power control command in accordance with the comparison by COMPARATOR 614. The power control command is provided to a transmission subsystem 622 of mobile station 306 for transmission on reverse link signals 304 shown in FIG. 3.

As stated above, DEINT/DECODE 610 provides a signal indicative of whether the frame was correctly decoded or whether a frame erasure was declared. THRESHOLD GEN 618 compiles a statistic of the frame error rate, symbol error rate, and a history of prior power control commands generated by the inner loop power control. Other commonly known metric data may also be calculated and maintained in various embodiments. In normal operation, if this inner loop historical information indicates that the power control system is not responding correctly or with sufficient swiftness, as discussed in the method section above, then THRESHOLD GEN 618, will not increase the target SIR. Alternatively, THRESHOLD GEN 618 may increase the target SIR between 0 and 0.5 dB, or higher. If the inner loop data indicates that the inner loop is responding correctly to changes in the system, then the THRESHOLD GEN 618 will provide a new higher target SIR to COMPARATOR 614. Further, in normal operation, when the frame error rate falls below the desired frame error rate threshold, THRESHOLD GEN 618 lowers target SIR and provides a new lower target SIR to COMPARATOR 614.

Returning to the operation of reverse link transmission subsystem 622, information for transmission on reverse link signals 304 is provided to an ENCODER/INTERLEAVER 624, which provides forward error correction on the data and then reorders the symbols in accordance with a predetermined interleaver format to provide time diversity in the transmitted signal. The interleaved encoded symbols are provided to power control puncturing element (PC SYMBOL PUNCTURING) 626, which punctures or multiplexes the power control symbols into the outgoing data. The signal is then provided to MODULATOR 628. In the exemplary embodiment, MODULATOR 628 is a CDMA modulator, the design and implementation of which is known in the art and is described in detail in the aforementioned U.S. Pat. Nos. 4,901,307 and 5,103,459. In particular, in an exemplary embodiment, MODULATOR 628 is a CDMA modulator capable of transmitting high-rate data such as that described in the aforementioned submissions, and described in aforementioned U.S. Pat. No. 6,396,804.

The modulated signal from MODULATOR 628 is provided to a transmitter (TMTR) 630 that up-converts, amplifies and filters the signal for transmission. In the exemplary embodiment, transmitter 630 modulates signals for transmission using a quaternary phase shift keying (QPSK) modulation format. In alternate embodiments, the present invention is applicable to any form of modulation, such as BPSK, QAM or FSK modulation. The QPSK signal is provided through duplexer 604 for transmission through antenna 602 as reverse link signals 304.

Returning to FIG. 5, reverse link signals 304 are received by base station 300 at antenna 520 and are provided to receiver 518. Receiver 518 down-converts, filters and amplifies the received signal and provides signal to DEMOD 516. DEMOD 516 demodulates the received signal and provides the demodulated symbols to de-multiplexer (DEMUX) 514. De-multiplexer 514 separates the power control commands from the signal and provides those commands to a power control processor 510.

The traffic data is provided to de-interleaver/decoder (DEINT/DECODE) 512. DEINT/DECODE 512 reorders the demodulated symbols and decodes the reordered symbols data in accordance with a predetermined error correction format such as a convolutional decoding or turbo decoding format and outputs the decoded data stream to a base station controller (not shown).

Under normal operation, power control processor 510 generates a new transmission power for the transmission of forward link signals 302 in accordance with the received power control commands. However, power control command processor 510 also determines transmission energy of the forward link signals 302 in accordance with transmission control data. The transmission control data will, in one example, provide maximum transmission energy for the transmission of forward link signals 302. When in response to the received power control commands, the transmission energy would exceed the allowed maximum transmission of forward link signals 302, then the transmission energy of the forward link signals 302 is not increased.

The above description of the preferred embodiments is provided to enable any person skilled in the art to make or use the present invention. Various changes or modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and features disclosed herein.

What is claimed is:

1. A method for adjusting a threshold in a power control system, comprising:
   determining past performance of the power control system, wherein the determining past performance includes determining a power control command pattern of a control loop;
   adjusting the threshold in accordance with the determined past performance;
   instructing a mobile station to increase its transmit power by sending to the mobile station a power up command when the power of a signal received from the mobile station is below the threshold; and
   inhibiting adjustment of the threshold when a number of consecutive power up commands is greater than a predetermined number.

2. The method as claimed in claim 1, wherein the inhibiting adjust of the threshold when a number of consecutive power up commands is greater than a predetermined number, comprises:
   inhibiting adjustment of the threshold when a number of consecutive power up commands is greater than the pre-determined number, and a verification check of a unit of received signal failed.

3. The method as claimed in claim 1, wherein the inhibiting adjust of the threshold when a number of consecutive power up commands is greater than a predetermined number, comprises:
   inhibiting adjustment of the threshold when a number of power up commands that occurred in past first pre-determined number of power control commands is greater than a second pre-determined number.

4. The method as claimed in claim 1, wherein the inhibiting adjust of the threshold when a number of consecutive power up commands is greater than a predetermined number, comprises:
   inhibiting adjustment of the threshold when a number power up commands that occurred in past first pre-determined number of power control commands is greater than a second predetermined number, and a verification check of a unit of received signal failed.

5. The method as claimed in claim 1, wherein the adjusting the threshold in accordance with the determined past performance comprises:
   decreasing an amount of adjustment of the threshold when a number of power up commands that occurred in past first pre-determined number of power control commands is greater than a second pre-determined number.

6. The method as claimed in claim 1, wherein the adjusting the threshold in accordance with the determined past performance comprises:
   decreasing an amount of adjustment of the threshold when a number of power up commands that occurred in past first pre-determined number of power control commands is greater than a second pre-determined number, and a verification check of a unit of received signal failed.

7. The method as claimed in claim 2, 4, or 6, wherein the unit of the received signal comprises a frame.

8. The method as claimed in claim 1, wherein the determining past performance of the power control system comprises:
   estimating quality metric of a unit of received signal.

9. The method as claimed in claim 8, wherein the adjusting the threshold in accordance with the determined past performance comprises:
   determining the difference between the estimated quality metric and a first threshold; and adjusting the threshold in accordance with the difference.

10. The method as claimed in claim 9, wherein the adjusting the threshold in accordance with the difference comprises:
    inhibiting adjustment of the threshold when the determined difference exceeds a second threshold.

11. The method as claimed in claim 9, wherein the adjusting the threshold in accordance with the difference comprises:
    decreasing an amount of adjustment of the threshold when the determined difference exceeds a second threshold.

12. The method as claimed in claim 1, wherein the threshold comprises a signal-to-interference threshold.

13. The method as claimed in claim 1, wherein the control loop comprises an inner control loop.

14. The method as claimed in claim 8, wherein the quality metric comprises a signal-to-noise ratio.

15. An apparatus for adjusting a threshold in a power control system, comprising:

a first power control processor to determine past performance of the power control system by determining a power control command pattern of a control loop; and a second power control processor, communicatively coupled to the first power control processor, the second power control processor to adjust the threshold in accordance with the determined past performance wherein the power control system increases a transmit power of a mobile station by sending to the mobile station a power up command when the power of a signal received from the mobile station is below the threshold; and wherein the second power control processor inhibits adjustment of the threshold when a number of consecutive power up commands is greater than a pre-determined number.

16. The apparatus as claimed in claim 15, wherein the second power control processor inhibits adjustment of the threshold when a number of consecutive power up commands is greater than a pre-determined number, and a verification check of a unit of received signal failed.

17. The apparatus as claimed in claim 15, wherein the second power control processor inhibits adjustment of the threshold when a number of power up commands that occurred in past first pre-determined number of power control commands is greater than a second pre-determined number.

18. The apparatus as claimed in claim 15, wherein the second power control processor inhibits adjustment of the threshold when a number power up commands that occurred in past first pre-determined number of power control commands is greater than a second pre-determined number, and a verification check of a unit of received signal failed.

19. The apparatus as claimed in claim 15, wherein the second power control processor decreases an amount of adjustment of the threshold when a number of power up commands that occurred in past first pre-determined number of power control commands is greater than a second pre-determined number.

20. The apparatus as claimed in claim 15, wherein the second power control processor decreases an amount of adjustment of the threshold when a number of power up commands that occurred in past first pre-determined number of power control commands is greater than a second pre-determined number, and a verification check of a unit of received signal failed.

21. The apparatus as claimed in claim 18 or 20, wherein the unit of the received signal comprises a frame.

22. The apparatus as claimed in claim 15, wherein the first power control processor estimates quality metric of a unit of received signal.

23. The apparatus as claimed in claim 22, wherein the second power control processor:
determines the difference between the estimated quality metric and a first threshold; and adjusts the threshold in accordance with the difference.

24. The apparatus as claimed in claim 23, wherein the second power control processor adjusts the threshold in accordance with the difference by inhibiting adjustment of the threshold when the determined difference exceeds a second threshold.

25. The apparatus as claimed in claim 23, wherein the second power control processor adjusts the threshold in accordance with the difference by decreasing an amount of adjustment of the threshold when the determined difference exceeds a second threshold.

26. The apparatus as claimed in claim 15, wherein the threshold comprises a signal-to-interference threshold.

27. The apparatus as claimed in claim 15, wherein the control loop comprises an inner control loop.

28. The apparatus as claimed in claim 22, wherein the quality metric comprises a signal-to-noise ratio.

29. An apparatus for adjusting a signal-to-interference ratio (SIR) threshold of a closed loop power control system used a wireless communications network, said closed loop power control system having an inner loop and an outer loop, comprising:
means for determining past performance of the power control system, wherein the determining past performance includes determining a power control command pattern of a control loop;
means for adjusting the threshold in accordance with the determined past performance;
means for instructing a mobile station to increase its transmit power by sending to the mobile station a power up command when the power of a signal received from the mobile station is below the threshold; and
means for inhibiting adjustment of the threshold when a number of consecutive power up commands is greater than a pre-determined number.

30. The apparatus as claimed in claim 29, wherein the means for inhibiting adjustment of the threshold when a number of consecutive power up commands is greater than a pre-determined number comprises means for inhibiting adjustment of the threshold when a number of consecutive power up commands is greater than the pre-determined number, and a verification check of a unit of received signal failed.

31. The apparatus as claimed in claim 29, wherein the means for inhibiting adjustment of the threshold when a number of consecutive power up commands is greater than a pre-determined number comprises means for inhibiting adjustment of the threshold when a number of power up commands that occurred in past first pre-determined number of power control commands is greater than a second pre-determined number.

32. The apparatus as claimed in claim 29, wherein the means for inhibiting adjustment of the threshold when a number of consecutive power up commands is greater than a pre-determined number comprises means for inhibiting adjustment of the threshold when a number power up commands that occurred in past first pre-determined number of power control commands is greater than a second pre-determined number, and a verification check of a unit of received signal failed.

33. A computer readable storage medium embodying computer executable instructions for adjusting a signal-to-interference ratio (SIR) threshold of a closed loop power control system used a wireless communications network, said closed loop power control system having an inner loop and an outer loop, the instructions comprising:
determining past performance of the power control system, wherein the determining past performance includes determining a power control command pattern of a control loop;
adjusting the threshold in accordance with the determined past performance;
instructing a mobile station to increase its transmit power by sending to the mobile station a power up command when the power of a signal received from the mobile station is below the threshold; and
inhibiting adjustment of the threshold when a number of consecutive power up commands is greater than a pre-determined number.

34. The computer readable medium of claim 33 wherein the instruction of inhibiting adjustment of the threshold when a number of consecutive power up commands is greater than a predetermined number, comprises:

inhibiting adjustment of the threshold when a number of consecutive power up commands is greater than the pre-determined number, and a verification check of a unit of received signal failed.

35. The computer readable medium of claim 33 wherein the instruction of inhibiting adjustment of the threshold when a number of consecutive power up commands is greater than a predetermined number, comprises:

inhibiting adjustment of the threshold when a number of power up commands that occurred in past first pre-determined number of power control commands is greater than a second pre-determined number.

36. The computer readable medium of claim 33 wherein the instruction of inhibiting adjustment of the threshold when a number of consecutive power up commands is greater than a predetermined number, comprises:

inhibiting adjustment of the threshold when a number power up commands that occurred in past first pre-determined number of power control commands is greater than a second predetermined number, and a verification check of a unit of received signal failed.

37. The computer readable medium of claim 33 further embodying the instructions comprising:

decreasing an amount of adjustment of the threshold when a number of power up commands that occurred in past first pre-determined number of power control commands is greater than a second pre-determined number.

38. The computer readable medium of claim 33 further embodying the instructions comprising:

decreasing an amount of adjustment of the threshold when a number of power up commands that occurred in past first pre-determined number of power control commands is greater than a second pre-determined number, and a verification check of a unit of received signal failed.

39. The computer readable medium of claim 33 further embodying the instructions comprising:

estimating quality metric of a unit of received signal.

40. The computer readable medium of claim 39 further embodying the instructions comprising:

determining the difference between the estimated quality metric and a first threshold; and adjusting the threshold in accordance with the difference.

41. The computer readable medium of claim 40 further embodying the instructions comprising:

inhibiting adjustment of the threshold when the determined difference exceeds a second threshold.

\* \* \* \* \*